(12) United States Patent
Benedetto et al.

(10) Patent No.: US 11,701,586 B2
(45) Date of Patent: Jul. 18, 2023

(54) DRAMA ENGINE FOR DRAMATIZING VIDEO GAMING

(71) Applicant: Sony Interactive Entertainment LLC, San Mateo, CA (US)

(72) Inventors: Warren Benedetto, Foothill Ranch, CA (US); Landon Noss, Laguna Niguel, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 107 days.

(21) Appl. No.: 16/109,289

(22) Filed: Aug. 22, 2018

(65) Prior Publication Data

US 2020/0061465 A1  Feb. 27, 2020

(51) Int. Cl.
*A63F 13/52* (2014.01)
*A63F 13/46* (2014.01)
*A63F 13/812* (2014.01)
*A63F 13/86* (2014.01)

(52) U.S. Cl.
CPC .............. *A63F 13/52* (2014.09); *A63F 13/46* (2014.09); *A63F 13/812* (2014.09); *A63F 13/86* (2014.09); *A63F 2300/577* (2013.01); *A63F 2300/61* (2013.01); *A63F 2300/8011* (2013.01)

(58) Field of Classification Search
CPC ........ A63F 13/52; A63F 13/46; A63F 13/812; A63F 2300/8011; A63F 2300/577; A63F 2300/61; A63F 13/86; A63F 13/35; A63F 13/55
See application file for complete search history.

(56) References Cited

U.S. PATENT DOCUMENTS

| | | | |
|---|---|---|---|
| 9,364,743 B2* | 6/2016 | Miura | A63F 13/00 |
| 9,630,097 B2* | 4/2017 | Paradise | A63F 13/12 |
| 10,335,690 B2* | 7/2019 | Schleicher | A63F 13/67 |
| 10,456,680 B2* | 10/2019 | Miron | A63F 13/847 |
| 2008/0231627 A1* | 9/2008 | Shearer | A63F 13/52 |
| | | | 345/419 |
| 2009/0208181 A1* | 8/2009 | Cottrell | A63F 13/00 |
| | | | 386/278 |
| 2017/0157512 A1* | 6/2017 | Long | A63F 13/86 |

* cited by examiner

*Primary Examiner* — Peter J Iannuzzi
(74) *Attorney, Agent, or Firm* — Penilla IP, APC

(57) ABSTRACT

A method for dramatizing video gaming is disclosed. The method includes receiving over a network from a client device contextual data corresponding to game play of a player playing a gaming application. The method includes identifying an event of dramatic significance is occurring or likely will occur in the game play based on the contextual data and historical data of a plurality of game plays relating to the gaming application. The method includes generating information dramatizing the event of dramatic significance. The method includes surfacing the information in connection with the game play.

12 Claims, 9 Drawing Sheets

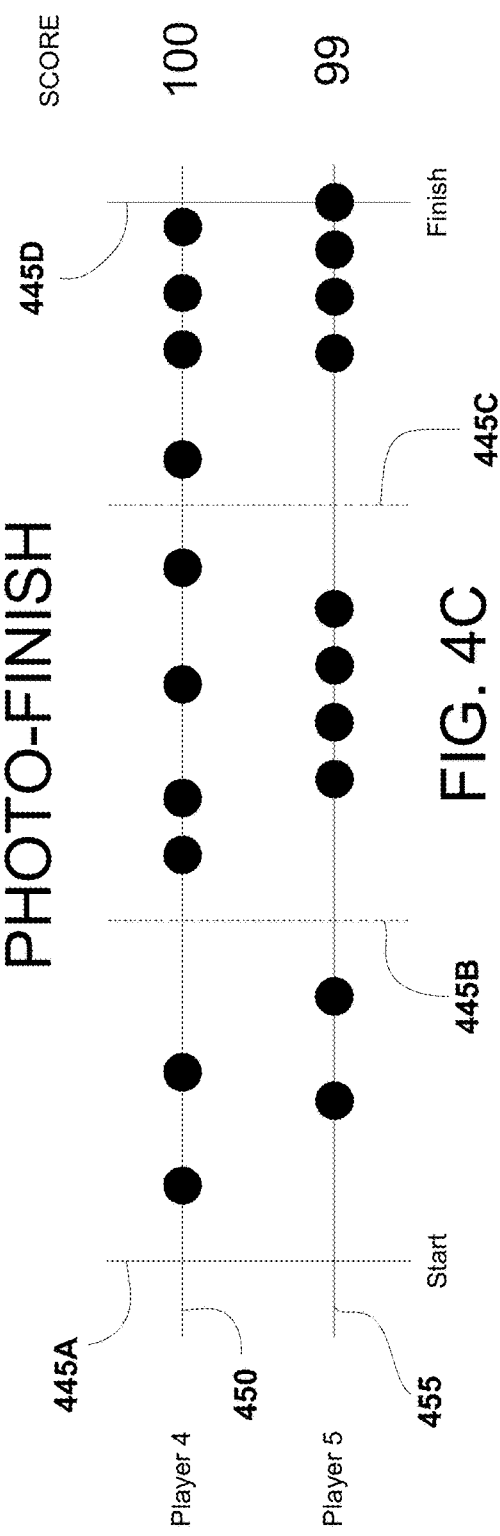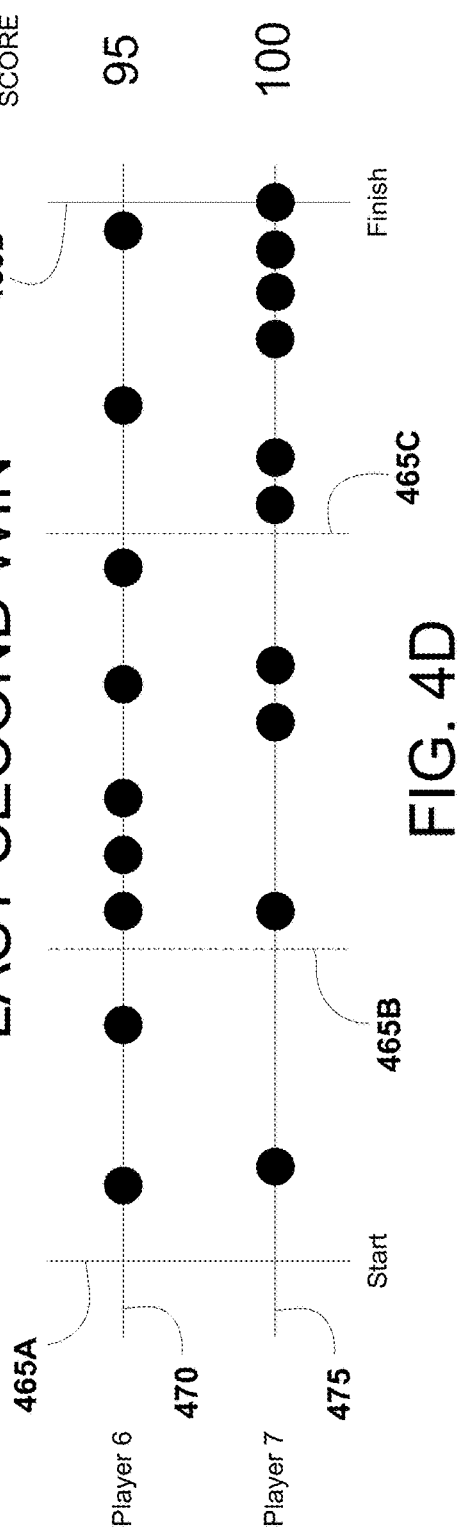

DRAMA ENGINE FOR DRAMATIZING VIDEO GAMING

CROSS-REFERENCE TO RELATED APPLICATIONS

The present application is related to U.S. Ser. No. 15/887,948, entitled "EVENT REEL GENERATOR FOR VIDEO CONTENT," with filing date of Feb. 2, 2018, which is herein incorporated by reference in its entirety.

TECHNICAL FIELD

The present disclosure is related to gaming applications. Among other things, this disclosure describes methods and systems for providing real-time, context-aware player statistics for adding excitement to game spectating and commentating.

BACKGROUND OF THE DISCLOSURE

In live sports, moments of drama are created by sportscasters based on their knowledge of the context of a situation. For example, in American football, the end of a Super Bowl game may be approaching, such that there is only 1 second left in the game (e.g., the fourth quarter). One team has possession of the football at their opponent's 43 yard line, and is down by two points. That team is down to their last possession given the time, and because it is fourth down. The kicking unit comes onto the field during a timeout to attempt a field goal. If the kicker makes the field goal, that team wins the game and the championship. On the other hand, if the kicker misses the field goal, that team goes home as the loser of the Super Bowl.

The above scenario itself is a dramatic situation. But it is made that much more dramatic by the commentators providing information to the viewing audience that the kicker has missed three out of his last four kicking attempts from that distance. In addition, the kicker has missed the exact same kick in a similar situation earlier in the year (e.g., missing a last second field goal to win the game). Other contextual information may be brought up, such as if the kicker makes this field goal that would be the kicker's longest kick of his career, so that the viewer knows that the kicker is trying to reach greater heights in personal performance. The commentator may know and mention that this kick, if successful, would be the longest field goal in Super Bowl history.

That kind of drama can only be created by the commentators with the knowledge of the statistics for that player, in that context, as well as the history of other players in the same situation. The commentators' knowledge may be based on their experience playing the game and/or spectating and studying the game over many years. However, that information is limiting. In particular, unless the commentator has an encyclopedic knowledge of the history of the game, and a flawless memory with instant recall, that known information is difficult to retrieve quickly during a game for purposes of commentary. As such, commentators (or the fact team behind a commentator) may spend many days researching facts relating to the game that he or she will be commentating on. For example, a football commentator may spend the week leading up to the game gathering facts about the players, statistics about the players, and other contextual facts about the game (e.g., the championship Super Bowl game for the National Football League). These commentators rely on some system to surface those facts at the appropriate time, and in real-time for the situation. Some commentators use a cheat sheet (e.g., each side of a manila folder) as a reference. Other commentators use a teleprompter or other device to surface facts. In that manner, the commentator is able to incorporate those stats and facts into his or her commentary, thereby creating a dramatic narrative that greatly increases the enjoyment for audiences.

In a sense, the drama and narrative provided by live commentators may be one of the reasons that watching a live sports event in person is often a letdown. When you're sitting in a stadium, without the benefit of the commentary, the significance of many moments may be lost, or diminished as the viewer is unaware of the context of a particular situation.

The problems faced by commentators in a live sporting event are also common to commentators of electronic sports (eSports) events, wherein eSports provides live competition using video games. In eSports events, there are similar commentators, who could benefit from tooling to make their commentary more dramatically compelling.

It is in this context that embodiments of the disclosure arise.

SUMMARY

Embodiments of the present disclosure relate to surfacing context related facts and statistics during game play of a gaming application. The context related facts and statistics may be collected during the game play of the player playing the gaming application, as well as during historical game plays of other players playing the gaming application. The related facts and statistics may be surfaced to the player, spectators, and/or commentators of the game play. Other embodiments relate to the packaging of two or more recordings of game plays of a gaming application in a media package that is edited to provide a story that is compelling to its viewers. The media package includes context related facts and statistics collected during the game play of the player playing the gaming application, as well as during historical game plays of other players playing the gaming application.

In one embodiment, a method for dramatizing video gaming is disclosed. The method includes receiving over a network from a client device contextual data corresponding to game play of a player playing a gaming application. The method includes identifying an event of dramatic significance is occurring or likely will occur in the game play based on the contextual data and historical data of a plurality of game plays relating to the gaming application. The method includes generating information dramatizing the event of dramatic significance. The method includes surfacing the information in connection with the game play.

In another embodiment, a method for dramatizing video gaming is disclosed. The method includes accessing a first recording of a first game play of a first player playing in single-player mode a segment of a gaming application, wherein the segment includes a plurality of possible events. The method includes accessing a second recording of a second game play of a second player playing in single-player mode the segment of the gaming application. The method includes identifying a plurality of performed events in the first game play and the second game play. The method includes generating a timeline of performed events. The method includes matching the timeline of performed events to a first story template of a plurality of predefined story templates. The method includes curating a media story including a presentation of at least portions of the first recording and the second recording based on the first story template.

In another embodiment, a non-transitory computer-readable medium storing a computer program for dramatizing video gaming is disclosed. The computer-readable medium includes program instructions for receiving over a network from a client device contextual data corresponding to game play of a player playing a gaming application. The computer-readable medium includes program instructions for identifying an event of dramatic significance is occurring or likely will occur in the game play based on the contextual data and historical data of a plurality of game plays relating to the gaming application. The computer-readable medium includes program instructions for generating information dramatizing the event of dramatic significance. The computer-readable medium includes program instructions for surfacing the information in connection with the game play.

In still another embodiment, a computer system is disclosed having a processor and memory coupled to the processor, the memory having stored therein instructions that, if executed by the computer system, cause the computer system to execute a method for dramatizing video gaming is disclosed. The method includes receiving over a network from a client device contextual data corresponding to game play of a player playing a gaming application. The method includes identifying an event of dramatic significance is occurring or likely will occur in the game play based on the contextual data and historical data of a plurality of game plays relating to the gaming application. The method includes generating information dramatizing the event of dramatic significance. The method includes surfacing the information in connection with the game play.

In another embodiment, a non-transitory computer-readable medium storing a computer program for dramatizing video gaming is disclosed. The computer-readable medium includes program instructions for accessing a first recording of a first game play of a first player playing in single-player mode a segment of a gaming application, wherein the segment includes a plurality of possible events. The computer-readable medium includes program instructions for accessing a second recording of a second game play of a second player playing in single-player mode the segment of the gaming application. The computer-readable medium includes program instructions for identifying a plurality of performed events in the first game play and the second game play. The computer-readable medium includes program instructions for generating a timeline of performed events. The computer-readable medium includes program instructions for matching the timeline of performed events to a first story template of a plurality of predefined story templates. The computer-readable medium includes program instructions for curating a media story including a presentation of at least portions of the first recording and the second recording based on the first story template.

In still another embodiment, a computer system is disclosed having a processor and memory coupled to the processor, the memory having stored therein instructions that, if executed by the computer system, cause the computer system to execute a method for dramatizing video gaming is disclosed. The method includes accessing a first recording of a first game play of a first player playing in single-player mode a segment of a gaming application, wherein the segment includes a plurality of possible events. The method includes accessing a second recording of a second game play of a second player playing in single-player mode the segment of the gaming application. The method includes identifying a plurality of performed events in the first game play and the second game play. The method includes generating a timeline of performed events. The method includes matching the timeline of performed events to a first story template of a plurality of predefined story templates. The method includes curating a media story including a presentation of at least portions of the first recording and the second recording based on the first story template.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIGS. 4A-4D illustrate various story templates used for generating a media package from two or more recordings of game plays of a gaming application, in embodiments of the present disclosure.

DETAILED DESCRIPTION

Figure 1A:
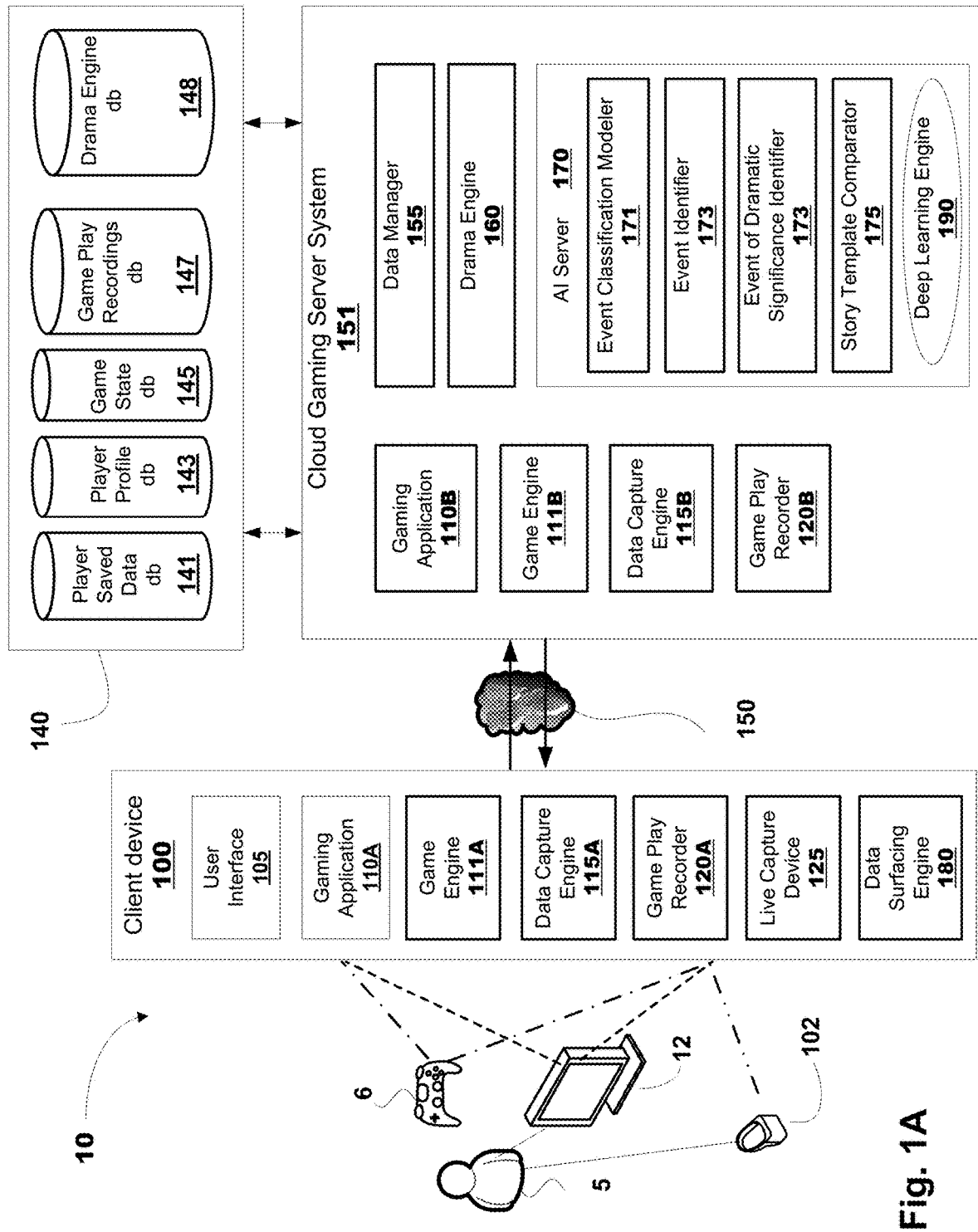
FIG. 1A illustrates a system configured for surfacing context related facts and statistics during game play of a gaming application, and/or for packaging of two or more recordings of game plays of a gaming application in a media package that is edited to provide a story that is compelling to its viewers, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods for dramatizing one or more game plays of players playing a gaming application. For example, embodiments of the present disclosure surface information (e.g., context related facts and statistics) during game play of a gaming application Other embodiments of the present disclosure package two or more recordings of game plays of a gaming application in a media package that is edited to provide a story that is compelling to its viewers. The generation of the information may be performed by artificial intelligence (AI) including deep learning. In this manner, the gaming experience of the player is improved, and the spectating experience of spectators viewing game plays of other players is also improved. In the case of spectating a livestream, or even playing alone, there is typically no color commentary, and as a result, a player playing the game play and/or the viewer of a livestream may not be aware when there may be moments of drama or tragedy during the game play, because no information is surfaced and no story is built around that game play. Embodiments of the present disclosure are configured to make that player and/or the viewer of a livestream to be aware of those moments of drama or tragedy during the game play. In one embodiment, a system is disclosed that is configured to understand vital statistics about the player, such as age, nationality, years of experience, etc. In another embodiment, a system is disclosed that is configured to track current player stats, progress, inventory, etc., for use in the dramatizing one or more game plays of players playing a gaming application. In still another embodiment, a system is disclosed that is configured to analyze the current status of a game play of a player against historical performance in the gaming application in order to find patterns of modeled events occurring in game plays other players in similar situations. In another embodiment, a system is disclosed that is configured to crunch data from similar players/situations into meaningful "facts", such as "nobody has ever done this before", "the chance of failure in this situation is 98%", "if he pulls this off, it will be a new world record", "he'll be the youngest person ever to do this kind of thing", etc. In still another embodiment, a system is disclosed that is configured to present these facts to commentators, viewers, and/or the players themselves in a way that helps set the context for the situation, and thereby providing the drama necessary to increase enjoyment of the success or failure of that moment. In one embodiment, a method is disclosed by which players can share videos of these moments with friends or via social media, wherein the significance of the moment is automatically encoded into the video, such as through a pre-roll graphic, a badge, motion graphics during gameplay, etc.

Some embodiments of the present disclosure may be provided within the context of electronic sports (eSports), wherein eSports is a form providing live competition using video games. In particular, embodiments of the present disclosure provide a system that analyzes the current gameplay context as well as historical game play context to surface relevant information (e.g., facts and statistics) that the commentators can weave into their commentary. For example, a multi-player video game competition between professional gamers may be held at a particular venue, with spectators viewing the competition live, and other spectators viewing a live stream of the competition. In eSports events, there are commentators, who benefit from tooling to make their commentary more dramatically compelling. That is, the surfacing of information (e.g., context related facts and statistics) relevant to one or more game plays may be provided to a commentator providing commentary for a live event promoting competitions of video gaming Still other viewers may watch a packaged recording of the competition, wherein the packaged recording includes commentary including relevant information that is surfaced to a commentator (e.g., real and/or automated).

With the above general understanding of the various embodiments, example details of the embodiments will now be described with reference to the various drawings.

Throughout the specification, the reference to "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

FIG. 1A illustrates a system 100A configured for dramatizing one or more game plays of players playing a gaming application, to include the surfacing of information (e.g., context related facts and statistics) during game play of a gaming application, and/or the packaging of two or more recordings of game plays of a gaming application in a media package that is edited to provide a story that is compelling to its viewers, in embodiments of the present disclosure. The surfacing of information and/or the packaging of two or more recordings of game plays of a gaming application in a media package for purposes of dramatization may be provided during game play of a player 5 playing a gaming application, such as in an overlay of the game play, or through user interface 105 in the form of various media formats (e.g., video, text, audio, etc.). For example, as is shown in FIG. 1A, the gaming application may be executing locally at a client device 100 of the player 5, or may be executing at a back-end processor operating at a back-end game server of a cloud game network or game cloud system 151. Though FIG. 1A illustrates the execution of a gaming application for game play of player 5, the client device 100 of player 5 is representative of any client device of a corresponding player, such that dramatization of one or more game plays of multiple players may be provided in isolation or in combination.

Client device 100 includes a client interactive gaming application 110A that is executing locally on a processor (not shown). During execution, the logic of the interactive gaming application 110A may make calls to the game engine 111A to perform one or more tasks for efficiency and speed. For example, game engine 111A may perform in whole or in part one or more of the following, 2D or 3D graphics, physics simulation, collision detection, etc. In the case of physics simulation, the game engine 111A may emulate realistic or developer defined laws of physics to simulate forces acting on objects within the interactive gaming application. As another example, the game engine 111A may be tasked to generate the background environment of a scene, such as generating trees, etc.

In another embodiment, the gaming application may be executing at a back-end processor operating at a back-end game server of a cloud game network or cloud gaming server system 151. For example, the cloud gaming server system 151 may include a plurality of virtual machines (VMs) running on a hypervisor of a host machine, with one or more virtual machines configured to execute a gaming application utilizing the hardware resources available to the hypervisor of the host in support of single player or multi-player video games. In that case, the client device 100 is configured for requesting access to a gaming application 110B over a network 150, such as the internet, and for rendering instances of video games or gaming applications executed by a processor at the cloud gaming server system 151 and delivering the rendered instances (e.g., audio and video) to the display device 12 and/or HMD 102 associated with a player 5. For example, player 5 may be interacting through client device 100 with an instance of a gaming application executing on cloud gaming server system 151. During execution, the logic of the interactive gaming application 110B may make calls to the server game engine 111B to perform one or more tasks for efficiency and speed.

In one embodiment, client device 100 is operating in a single-player mode for a corresponding player that is playing a gaming application. In other embodiments, the cloud gaming server system 151 is configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment. For example, using state sharing data and multi-player logic objects and characters may be overlaid/inserted into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

Whether the application is executing locally at client device 100, or at the back end cloud gaming server system 151, the client device 100 may receive input from various types of input devices, such as game controllers 6, keyboards (not shown), gestures captured by video cameras, mice, touch pads, etc. Client device 100 can be any type of computing device having at least a memory and a processor module that is capable of connecting to the back-end server system 151 over network 150. Some examples of client device 100 include a personal computer (PC), a game console, a home theater device, a general purpose computer, mobile computing device, a tablet, a phone, a thin client device, or any other types of computing devices. Client device 100 is configured for receiving and/or generating rendered images, and for displaying the rendered images on display 12, or alternatively on a head mounted display (HMD) 102. For example, the rendered images may be generated by the client interactive gaming application 110A as executed by the client device 100 in response to input commands that are used to drive game play of player 5, or the rendered images may be generated by the server interactive gaming application 110B as executed by the cloud gaming server system 151 in response to input commands used to drive game play of player 5. In embodiments, the HMD 102 can be configured to perform the functions of the client device 100.

The client device 100 also includes a data capture engine 115A that is configured to interact with cloud gaming server system 151 for capturing information related to the game play of player 5. For example, the captured information may include game context data (e.g., low level OS contexts) of the game play of user 5 when playing a gaming application, and global context information. Each game context includes information (e.g., game state, user information, etc.) related to the game play, and may include low level OS information related to hardware operations (e.g., buttons actuated, speed of actuation, time of game play, etc.). More particularly, a processor of client device 100 executing the gaming application 110A is configured to generate and/or receive game and/or OS level context of the game play of user 5 when playing the gaming application. In addition, global context data is also collected, and related generally to user profile data (e.g., how long the player plays a gaming application, when the last time the player played a gaming application, how often the player requests assistance, how skilled the player is compared to other players, etc.). In one implementation, game contexts including OS level contexts and global contexts may be generated by the local game execution engine 111 on client device 100, outputted and delivered over network 150 to game processor 201, as managed through the data manager 155. In addition, game contexts including OS level contexts and global contexts may be generated by could gaming server system 151 when executing the server gaming application 110B, and stored in database 140 as managed by the data manager 155. Game contexts including OS level contexts and global contexts may be locally stored on client device 100 and/or stored at the within database 140.

In particular, each game context includes metadata and/or information related to the game play. Game contexts may be captured at various points in the progression of playing the gaming application, such as in the middle of a level. For illustration, game contexts may help determine where the player (e.g., character of the player) has been within the gaming application, where the player is in the gaming application, what the player has done, what assets and skills the player or the character has accumulated, what quests or tasks are presented to the player, and where the player will be going within the gaming application.

For example, game context also includes game state data that defines the state of the game at that point. For example, game state data may include game characters, game objects, game object attributes, game attributes, game object state, graphic overlays, location of a character within a gaming world of the game play of the player 5, the scene or gaming environment of the game play, the level of the gaming application, the assets of the character (e.g., weapons, tools, bombs, etc.), the type or race of the character (e.g., wizard, soldier, etc.), the current quest and/or task presented to the player, loadout, skills set of the character, game level, character attributes, character location, number of lives left, the total possible number of lives available, armor, trophy, time counter values, and other asset information, etc. In that manner, game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may include low level OS data, such as buttons actuated, speed of actuation, which gaming application was played, and other hardware related data. Game state data may also identify which parts of the executable code need to be loaded to execute the video game from that point. The game state data is stored in game state database 145.

Also, game context may include user and/or player information related to the player. Generally, user/player saved data includes information that personalizes the video game for the corresponding player. This includes information associated with the player's character, so that the video game is rendered with a character that may be unique to that player (e.g., shape, race, look, clothing, weaponry, etc.). In that manner, the user/player saved data enables generation of a character for the game play of a corresponding player, wherein the character has a state that corresponds to the point in the gaming application experienced currently by a corresponding user and associated with the game context. In addition, user/player saved data may include the skill or ability of the player, recency of playing the interactive gaming application by the player, game difficulty selected by the player 5 when playing the game, game level, character attributes, character location, number of lives left, the total possible number of lives available, armor, trophy, time counter values, and other asset information, etc. User and/or player information may be stored in player saved database 141 of database 140. Other user/player may also include user profile data that identifies a corresponding player (e.g., player 5), which is stored in database 143.

In addition, the game play of player 5 may be recorded for later access. The game play may be captured locally by game play recorder 120A, or captured at the back-end at the game play recorder 120B. Capture of the game play by recorder 120A or 120B (e.g., at back-end) may be performed whether the execution of the gaming application is performed at the client device 100, or at the back-end cloud gaming server system 151. Game play recordings may be stored in database 247.

In addition, client device 100 includes a live capture device 125 that is configured for capturing the responses and/or reactions of player 5 while playing the gaming application. These responses and/or reactions may be used for further analysis (e.g., to determine events or events of dramatic significance), and also may be used for inclusion within a media package showcasing one or more game plays for streaming to other viewers upon demand These responses and/or reactions may also be stored at client device 100, or at the database 140 for alter access.

In one embodiment, a back-end server, such as the cloud gaming server system 151, is configured to provide dramatization of video gaming, including the surfacing of information (e.g., context related facts and statistics) during game play of a gaming application, and/or the packaging of two or more recordings of game plays of a gaming application in a media package that is edited to provide a story that is compelling to its viewers. For example, the drama engine 160 is configured to provide the dramatization of video gaming with cooperation of artificial intelligence (AI) server 170. Drama engine 160 provides the dramatization of video gaming, including the surfacing of information (e.g., context related facts and statistics) during game play of a gaming application, and/or the packaging of two or more recordings of game plays of a gaming application in a media package that is edited to provide a story that is compelling to its viewers.

In particular, the metadata and information for the game context of the game play of player 5, as well as historical game contexts of other players playing the same gaming application, may be analyzed to generate relevant information (e.g., facts, statistics, etc.) that provide dramatization of the game play of player 5, or other game plays of other players. The analysis of the game contexts is performed through deep learning, such as by deep learning engine 190 of AI server 170. In particular, AI server 170 includes an event classification modeler 171 that builds and generates models of events occurring within a gaming application. Deep learning engine 190 is trained to build and generate models of events, and can be used for matching data to one or more models of events. In one embodiment, the models are for events of dramatic significance, e.g., a last second win, come from behind victory, a personal record, a universal record, etc. The event identifier 173 is configured to identify and/or match events occurring within a game play of player 5 or another player to a modeled event to understand the context of the game play with the cooperation of the deep learning engine 190. An event or batch of events may indicate that the game play is reaching a climax, and that the game play may break a record (e.g., personal, universal, etc.). Further, the event of dramatic significance identifier 173 is configured to identify and/or match one or more events occurring within the game play of player 5 or another player to a modeled event of dramatic significance with the help of the deep learning engine 190. In that manner, it may be determined whether a player may be approaching a significant event in his or her game play. For example, dramatic significant events may be a player reaching a personal record, a universal record, doing something new or rare, accomplishing a difficult task or challenge, overcoming a personal or universal negative trend, achieving a personal or universal positive trend, etc. Further, a story template comparator 175 is configured to identify and/or match a sequence of events within one or more game plays of one or more players to a story template for purposes of building a media package including the game plays. For example, a media package may include two game play recordings that were performed asynchronously but were identified and/or matched to tell a story following a story template. Story templates may define sports dramas, such as the underdog, the come-from-behind win, the blow-for-blow performance between two game plays, the photo finish, the Hail Mary pass to win the game, the single-player record, the multi-player record, the agony of defeat, the rookie who wins the game, the veteran down on his luck who wins the game, etc.

Figure 1B:
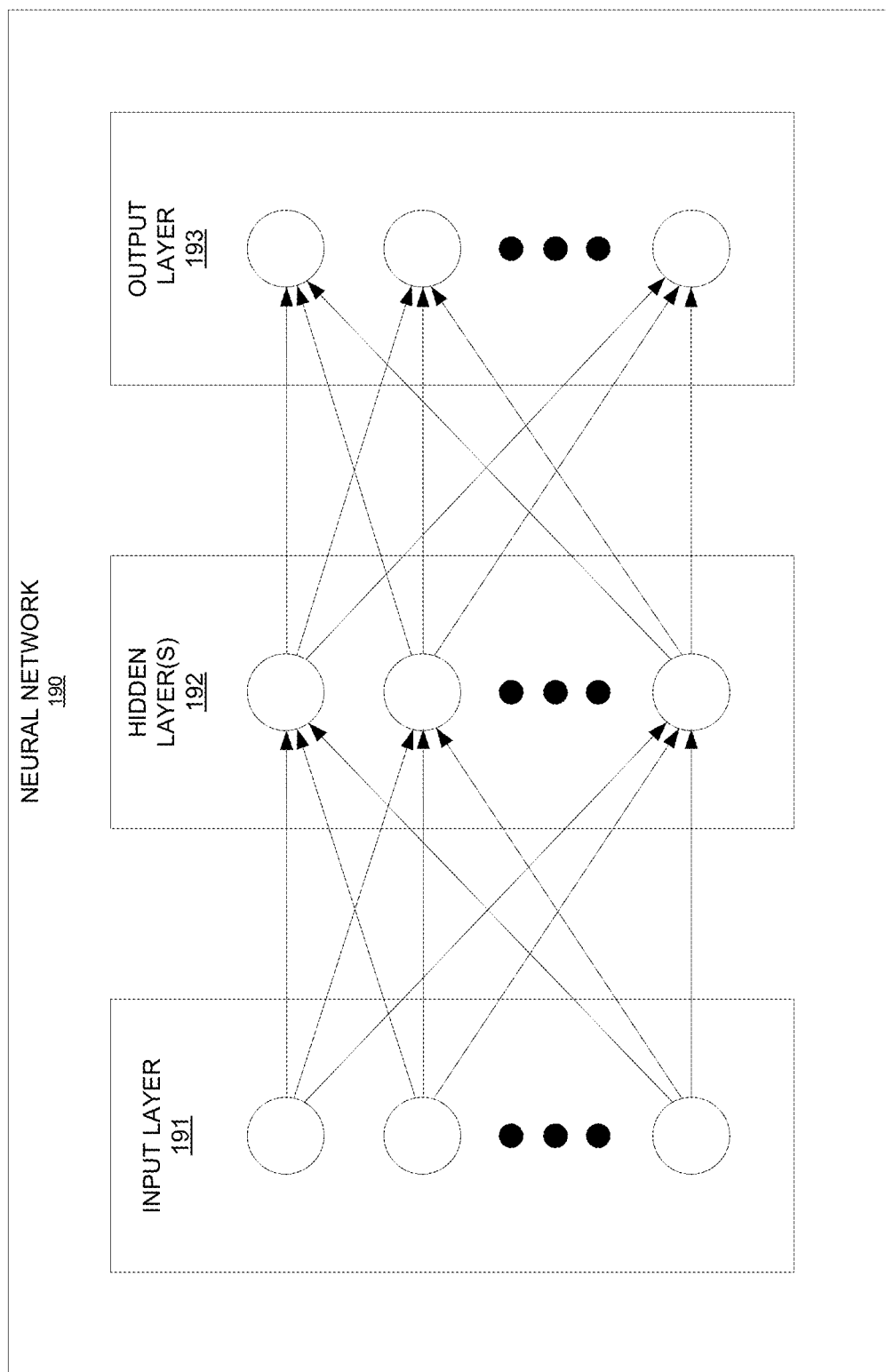
FIG. 1B illustrates an example neural network used for surfacing context related facts and statistics during game play of a gaming application, and/or for packaging of two or more recordings of game plays of a gaming application in a media package that is edited to provide a story that is compelling to its viewers, in accordance with one embodiment of the present disclosure.

FIG. 1B illustrates an example neural network used for dramatizing one or more game plays of one or more players, including the surfacing context related facts and statistics during game play of a gaming application, and/or for packaging of two or more recordings of game plays of a gaming application in a media package that is edited to provide a story that is compelling to its viewers, in accordance with one embodiment of the present disclosure. Specifically, the deep learning or machine learning engine 190 in the AI server 170 is configured as input to receive information related to game plays of one or more players playing a gaming application, for example. The deep learning engine 190 utilizes artificial intelligence, including deep learning algorithms, reinforcement learning, or other artificial intelligence-based algorithms to build the event models, event of dramatic significance models, story template models, etc. For example, during a learning and/or modeling phase, input data is used by the deep learning engine 190 to create event models that can be used for the dramatization of one or more game plays of one or more players.

In particular, neural network 190 represents an example of an automated analysis tool for analyzing data sets to determine the events performed during a gaming application, such as an event of dramatic significance, or events occurring during the normal game play of an application. Different types of neural networks 190 are possible. In an example, the neural network 190 supports deep learning. Accordingly, a deep neural network, a convolutional deep neural network, and/or a recurrent neural network using supervised or unsupervised training can be implemented. In another example, the neural network 190 includes a deep learning network that supports reinforcement learning. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to local data 115 representative of events occurring during game plays of a gaming application. For example, the data may be collected from live game plays, or automated game plays performed through simulation.

At the highest hierarchical level, an output layer 193 exists. The output layer 193 includes a set of output nodes. An output node represents a decision (e.g., prediction) that relates to information of an event. As such, the output nodes may match an event occurring within a game play of a gaming application given a corresponding context to a particular modeled.

These results can be compared to predetermined and true results obtained from previous game plays in order to refine and/or modify the parameters used by the deep learning engine 190 to iteratively determine the appropriate event and event of dramatic significance models. That is, the nodes in the neural network 190 learn the parameters of the models that can be used to make such decisions when refining the parameters. In that manner, a given event may be associated with ever refined modeled events, and possibly to a new modeled event.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation f is applied to the input nodes through the hidden layer 192, in one implementation. In an example, the transformation f is non-linear. Different non-linear transformations f are available including, for instance, a linear rectifier function $f(x) = \max(0, x)$.

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the patterns and/or characteristics of similar queries based on a given set of inputs or input data. For example, the data domain includes queries related to a specific scene in a gaming application for a given gaming context. In another example, the training dataset is from different data domains to include input data other than a baseline. As such, the neural network 190 may recognize a query using other data domains, or may be configured to generate a response model for a given query based on those data domains.

Figure 2A:
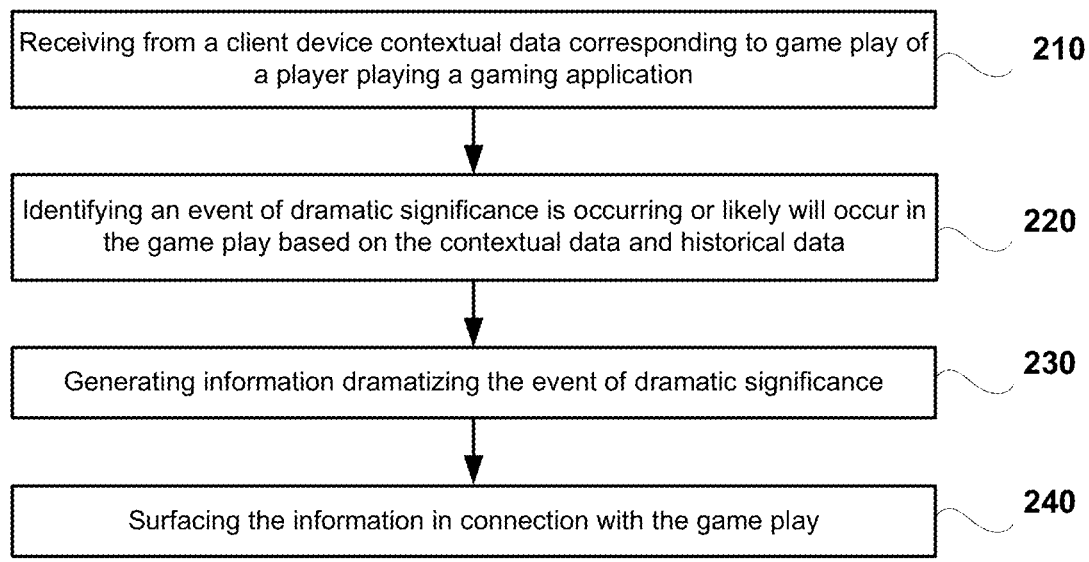
FIG. 2A illustrates a flow diagram illustrating steps in a method for surfacing context related facts and statistics during game play of a gaming application, in accordance with one embodiment of the present disclosure.

With the detailed description of the various modules of the cloud gaming server system 151 and client device 100 communicating over a network 150, a method for providing dramatization of video gaming is disclosed, including the surfacing of information (e.g., context related facts and statistics) during game play of a gaming application, wherein the gaming application can be executing on a local computing device or over a cloud gaming server system is now described in relation to flow diagram 200A of FIG. 2A, in accordance with one embodiment of the present disclosure. Flow diagram 200A illustrates the process and data flow of operations involved at the cloud gaming server side for purposes of identification, generation, and/or surfacing of information related to a game play of a player playing a gaming application through a deep learning engine. The information may be delivered in association with the game play, or may be delivered to a third party for use (e.g., commentator), or may be used within a media package or highlight reel including the game play of the player. In particular, the method of flow diagram 200A may be performed at least in part by the drama engine 160 and/or AI server 170 of FIG. 1A.

At 210, the method includes receiving over a network from a client device contextual data corresponding to game play of a player playing a gaming application. As previously described, the contextual data may include metadata and/or information related to the game play, game state data that allows for the generation of the gaming environment that existed at a corresponding point in the video game, user/player saved data includes information that personalizes the video game for the corresponding player (e.g., data regarding a character), user profile data, etc.

At 220, the method includes identifying an "event of dramatic significance" is occurring or likely will occur in the game play based on the contextual data and historical data of a plurality of game plays relating to the gaming application. The event of dramatic significance is distinguished from ordinary events (e.g., sub-events) occurring within a game play, wherein the ordinary events may transpire to achieve progress through the gaming application, but do not necessarily reach a high level of drama. In particular, the contextual data for game play of a player may be compared to data gathered from game plays (e.g., historical game plays) of multiple players playing the same gaming application, for example. That comparison of the current context of the game play of the player against the contexts of the universe of game plays can be used to determine that the event in the current game play of the player is one of dramatic significance. As an illustration, the game plays may be associated with a challenge within a particular gaming application. The challenge may be developed within the gaming application (e.g., a coded challenge), or be discovered by one or more players when playing the gaming application (e.g., a challenge to beat a boss within a defined period and with minimal weapons). Based on the historical data, certain events may be known to occur within multiple game plays of multiple players. For example, beating a mega-boss may be ultimate task or challenge in a game, wherein a player's game play (e.g., through multiple sessions) of a gaming application always has a battle with the mega-boss.

In particular, game play of a player may be tracked to determine when a player is battling the mega-boss. Metadata relating to the game play is collected, such as player's inventory, stats, etc. to determine the context of the game play (e.g., battling the mega-boss). The metadata from the game play of the player may be compared against and matched against metadata collected from the universe of game plays to determine when the player is battling the mega-boss. It may be determined that battling the mega-boss is extremely difficult, thereby making that battle an event of dramatic significance. For example, by analyzing historical data of multiple game plays of multiple players all encountering the mega-boss, it may be determined that the player is attempting something hugely risky because ninety-five percent of all attempts across all the universe of game plays have failed.

In addition, based on historical data of the universe of game plays, a model of the event of dramatic significance, which in this case is battling the mega-boss, can be built. The model may be defined by one or more actions taken within the game play, sub-events, and or other information that define and/or lead up to the overall event of dramatic significance of battling the mega-boss. As such, similar actions and/or sub-events tracked within the current game play of the player may be matched to the model to determine when the player is also experiencing an event of dramatic significance (e.g., battling the mega-boss).

In one embodiment, an event of dramatic significance may be identified by matching the contextual data to one or more of a plurality of statistical patterns of dramatic significance. That is, there are statistical patterns known to be of dramatic significance. These patterns may be recognized across one or more gaming applications. Further, those patterns may be discoverable within a particular gaming application. As such, those statistical patterns may also be modeled through the deep learning engine, for example, as sub-events or sub-categories of any event of dramatic significance.

In the player's game play, the analysis of an event may involve determining how many of the statistical patterns of dramatic significance are matched. Matching may be performed on a predefined or open (e.g., dynamically expanding and/or contracting) list of statistical patterns of dramatic significance. A total match score may be generated. For example, a point is given for each match with the statistical patterns of dramatic significance. The event of dramatic significance may be identified (e.g., as being one of dramatic significance) when the total match score satisfies a threshold (e.g., is greater than or equal to the threshold of matches).

In one implementation, the plurality of statistical patterns of dramatic significance may be weighted, such that one or more of the statistical patterns may be given a corresponding weight. In one embodiment, a higher weight (e.g., greater than 1) indicates a greater degree of dramatic significance. In another embodiment, a lower weight may indicate a greater degree of dramatic significance depending on how the total score is determined.

Purely for illustration, a list of statistical patterns of dramatic significance may include, but is not limited to the following. Other statistical patterns of dramatic significance may be supported, though not listed below. Also, one or more statistical patterns may be used for matching when determining whether an event of dramatic significance can be identified. One statistical pattern of dramatic significance may be related to a threshold. That is, the player is accomplishing something in the event of dramatic significance that meets and/or exceeds a threshold. For example, the player has accomplished something far better/faster/more than anyone has ever accomplished by some order of magnitude over previous attempts. One statistical pattern of dramatic significance may be related to beating a universal record across a plurality of players. That is, the player is about to beat a universal record across the universe of game plays for a gaming application. Another statistical pattern of dramatic significance may be related to beating a personal record. That is, the player is about to beat a personal record within his or her game play of the gaming application. Another statistical pattern of dramatic significance may be related to the novelty of the event of dramatic significance. That is, the player may be attempting something within his or her game play that is new/novel and has never been attempted before. Another statistical pattern of dramatic significance may be related to the rarity of the event of dramatic significance. Another statistical pattern of dramatic significance may be related to the difficulty in accomplishing the event of dramatic significance. For example, beating the mega-boss may be extremely difficult, and results in a ninety-five percent failure rate. Another statistical pattern of dramatic significance may be related to a positive trend of accomplishing the event of dramatic significance. That is, the player in his or her game play may be gradually achieving success, such that with each successive attempt the player is getting closer to accomplishing a task, mission, challenge, goal (e.g., beating the mega-boss). Or the player may have accomplished other tasks with similar difficulty multiple times in a row. Still another statistical pattern of dramatic significance may be related to a negative trend of accomplishing the event of dramatic significance. That is, the player in his or her game play may be performing poorly in accomplishing a task, mission, challenge, goal (e.g., beating the mega-boss) without any sign of improvement.

At 230, the method includes generating information dramatizing the event of dramatic significance. The information may be related to the historical game plays that help define why that event is so dramatic, or important within the context of the universe of game plays (e.g., 95 percent failure rate). In that manner, the player is able to understand why his or her game play may be important within the universal context of the event of dramatic significance.

Other information may be generated that personalizes the drama to the player. This personal context may provide added drama to the event of dramatic significance. In particular, based on the personal data (current and historical) for game plays of a particular player playing a gaming application, it can be determined that the player has been in this exact same situation a number of times before (e.g., five times before to battle the mega-boss), and has always failed. In addition, based on the personal data (current and historical), it can be determined that the player came very close to defeating the mega-boss in the last attempt. The information also may be analyzed to determine that in the last time, the player approached the mega-boss from a different direction (physically, in the game), and that the player is choosing to use a different set of weapons in the current attempt to battle the mega-boss. This personalized information may ramp up the drama of the player's success or failure in that moment.

At 240, the method includes surfacing the information in connection with the game play. The information may be generated in relation to determining that the player is experiencing an event of dramatic significance. For example, dramatic information may be surfaced that indicates that in the universe of game plays, the failure rate of battling the mega-boss is higher than ninety-five percent. Also, dramatic information may be surfaced that indicates that no other player has ever defeated this level (e.g., defeat the mega-boss) with less than ten percent (10%) health remaining, and that the player is closing in on a new record, or accomplishing something new.

In addition, dramatic information may be surfaced that relate personally to the player. For instance, information may be surfaced that the player has never beaten the mega-boss in over five attempts. Information may be surfaced indicating that the player is close to beating the mega-boss, and was within 2 percent of beating the mega-boss (e.g., mega-boss was down to 2 percent health) in the player's last attempt. Also, information may be surfaced indicating that the current weapons choice may be beneficial or detrimental in terms of succeeding to defeat the mega-boss based on historical data of the universe of game plays. Still other dramatic information may be discovered, generated, and/or surfaced.

In one embodiment, the information includes a plurality of ready-to-go and up-to-date facts that describe the historical significance of the event of dramatic significance. In other embodiments, the information may be generated on-the-fly. In either case, the information provides historical context to the event. For example, numerous facts may be presented about the gaming application to provide context. These facts may be generated based on the historical data collected from the universe of game plays of a gaming application.

In one embodiment, the information is surfaced to the player. In particular, the information generated by the drama engine is delivered over the network to the client device for presentation to the player during the game play. The information may be surfaced (e.g., overlaid) within the game play, in one embodiment. The information may be delivered to a different device, such as one (e.g., a tablet) that is not displaying the game play, in another embodiment.

Figure 2B:
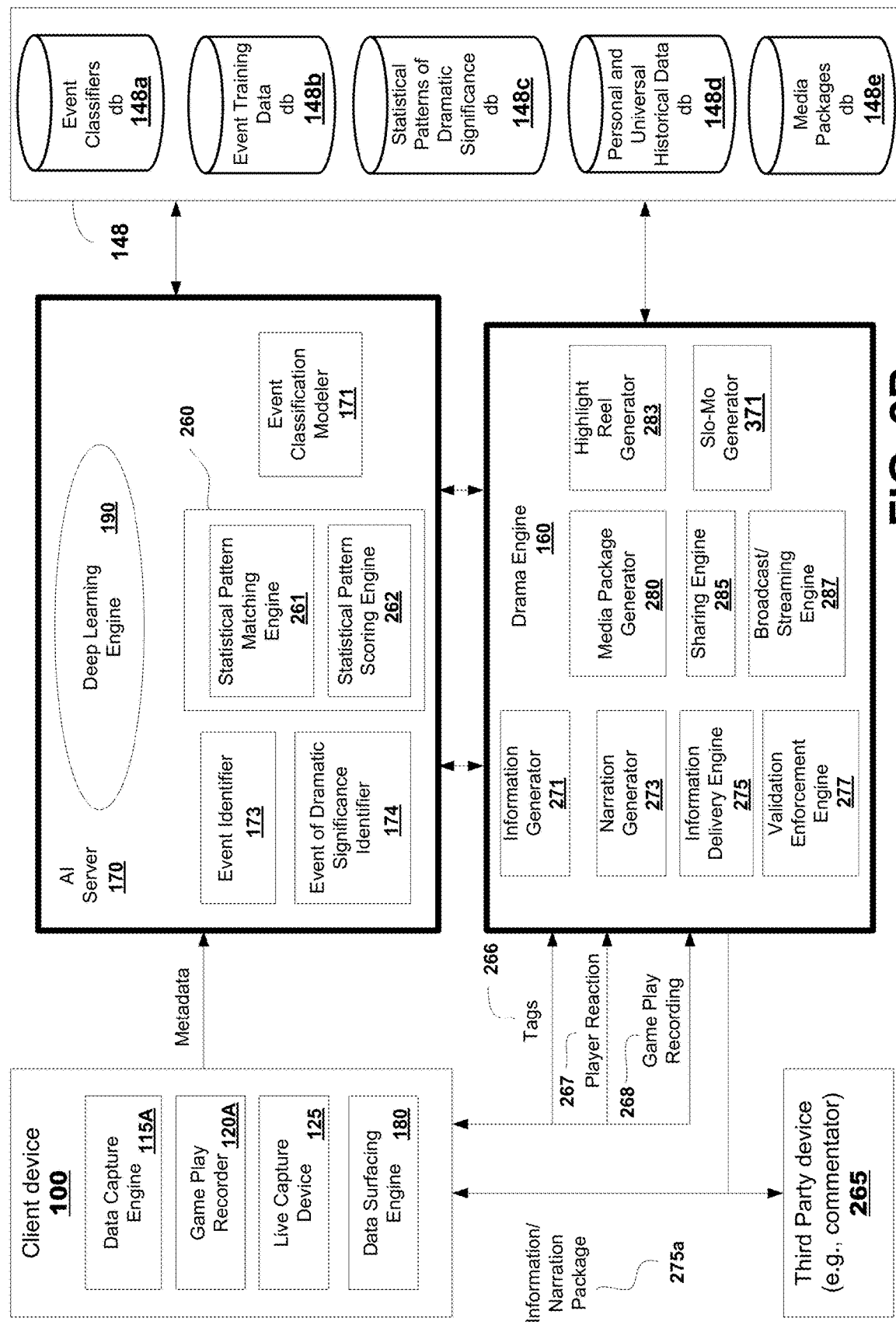
FIG. 2B illustrates a system including a drama engine configured for surfacing context related facts and statistics during game play of a gaming application, in accordance with one embodiment of the present disclosure.

FIG. 2B illustrates a system including a drama engine 160 that is configured for surfacing context related facts and statistics during game play of a gaming application, in accordance with one embodiment of the present disclosure. The drama engine 160 is located at a back-end server, such as the cloud gaming server system 151. For example, the drama engine 160 may be configured to implement the method of flow diagram 200A, in one embodiment.

As shown, the client device 100 is shown communicatively coupled with the drama engine 160 (e.g., through network 150. As previously described, client device is configured to collect and/or capture information and metadata related to the game play of a player (e.g., player 5). That information is passed back to the cloud gaming server system 151, and more specifically to the drama engine and/or the AI server 170 for purposes of surfacing context related facts and statistics during game play of a gaming application. For example, the data capture engine 115A is configured to interact with cloud gaming server system 151 (e.g., AI server 170 and/or drama engine 160) for capturing information and metadata related to the game play of player 5. The data surfacing engine 250 on the client device 100 may be configured to present the information, such as through an independent device separate from the one displaying the game play, or through the same device that is displaying the game play (e.g., through an overlay).

As previously described, the AI server 170 may include an event classification modeler 171 that is configured to generate models of events, including sub-events (e.g., ordinary events) and/or events of dramatic significance. The event classification modeler 171 may be trained using event training data stored in database 148b of the drama engine database 148 with cooperation of the deep learning engine 190. For example, the event training data may be based on historical game plays of one or more players of a gaming application. The resulting event classifiers generated by the event classification modeler 171 based on the training data are stored in database 148a of the drama engine database 148.

In addition, as previously described, the event identifier 173 is configured to match events (e.g., sub-events or ordinary events) occurring during the game play of a player to modeled events generated by the event classification modeler 171. Also, the event of dramatic significance identifier 174 is configured to match events of dramatic significance occurring during the game play of a player to modeled events of dramatic significance generated by the event classification modeler 171.

In one embodiment, an event of dramatic significance may be identified through matching of one or more statistical patterns of dramatic significance, as previously described. For example, the statistical pattern matching engine 261 with cooperation of the deep learning engine 190 is configured to match data collected from the game play (e.g., relating to an event) of a player to with one or more statistical patterns of dramatic significance that are modeled and stored in database 148c. For example, statistical patterns of dramatic significance may include, but is not limited to, the following: threshold, novelty, rarity, difficulty, personal record, negative trend, and positive trends, etc. The statistical pattern scoring engine 262 is configured to score the matching performed by statistical pattern matching engine 261. When the total score satisfies a threshold, the data is determined to be an event of dramatic significance.

In one embodiment, the drama engine is further configured for surfacing information (e.g., context related facts and statistics) during game play of a gaming application. For example, information generator 271 is configured to generate information that may be related to the historical game plays that help define why that event is so dramatic, or important within the context of the universe of game plays, or generate information that personalizes the drama to the player. The information may be generated and/or stored in database 148d. In that manner, the player understands why the game play may be important both within a personal context of game play and within a universal context of multiple game plays of a gaming application of multiple players. In addition, the information delivery engine 275 is able to deliver the information 275a to one or more devices. In one embodiment, the information 275 is delivered over a network to a client device 100 in association with the game play of the corresponding player (e.g., for presentation during the game play). For example, the data surfacing engine 180 is configured to surface the information, such as in the game play being displayed, or on another device in association with the game play. In another embodiment, the information 275a is delivered over a network to a third party device 265 (e.g., of a commentator that is providing live or recorded commentary of the game play.

In another embodiment, the information is surfaced to a commentator of the game play either in a live setting or recorded setting. For example, the information 275a is delivered over a network to a third party device 265 (e.g., of a commentator that is providing live or recorded commentary of the game play. Purely for illustration, some embodiments of the present disclosure may be provided within the context of eSports that provides live competition using video games. For example, a multi-player video game competition between professional gamers may be held at a particular eSports venue. As the eSports industry grows, and viewership increases, live-sports style color commentary will become an integral part of the viewing experience. Over time, long histories of stats, similar situations, etc. will be captured relating to game plays of gaming applications that are used during eSports events, just like in live sports. Information (e.g., context related facts and statistics) relevant to one or more game plays may be surfaced to commentators who can weave that information into their commentary of the eSports event. The commentary may be provided for a live event (e.g., being streamed by the broadcast/streaming engine 287), or for a recorded event, or for packaged media content that is produced based on the game plays of one or more players, and streamed upon demand by the broadcast/streaming engine 287.

In one embodiment, the difference between live sports and eSports events is that with eSports real data and statistics may be outputted to a system which can process the stats into important "facts". As previously described, the system is configured to recognize similar situations (e.g., events) when they arise again (e.g., using deep/machine learning), and can surface interesting facts that commentators can use to build a narrative for viewers.

In still another embodiment, another part of sports drama are the human reactions to what's happening or what just happened. It's not just about watching the player (e.g., through a corresponding character) score (e.g., a touchdown in a football game). Instead, the spectator may be more interested in viewing the reaction of the opposing coach, the reaction of the linebacker who missed the tackle as he returns to the bench (e.g., throws his helmet), the reactions of the player as he or she is playing the gaming application, etc.

In embodiments, based on the predictive identification of an event of dramatic significance occurring or about to occur, reactions can be predictively captured while the player is experiencing the event of dramatic significance. For example, the reactions may be captured by the live capture device 125, such as using a multi-camera setup, or even using a camera located within a game console system (e.g., PlayStation game console system). Imagine a player is about to break a record or win a match or even lose a match, each of which is identified as an event of dramatic significance in the game play of the player. An instruction by the drama engine 160 can be given to the corresponding capture device 125 to pre-emptively start recording the player's reaction. The captured reaction 267 is delivered to the drama engine for further use and storage.

Further, that reaction can be mixed into a replay or highlight reel of the game play that is generated, such as by the highlight reel generator 283. As such, when the player shares the event of dramatic significance (e.g., via the sharing engine 285 over social media), the player is not just sharing what happened on screen, but also sharing video of his or her reactions as captured extemporaneously and automatically based on the analysis performed by the drama engine (e.g., captured during the game play including the event of dramatic significance). For example, concurrent with and after beating a universal record in a gaming application, the reactions of the player may be capture at the moment that the record was beaten, wherein the player is jumping up and down yelling—"YES! YES! YES! YES!. . . .

In one embodiment, packaged media content (e.g., a highlight reel) may be generated including the event of dramatic significance. For example, media package generator 280 is configured to create a media package of one or more game plays. In particular, a recording of a portion of the game play corresponding to the event of dramatic significance is performed. In one embodiment, the recording is performed by the game play recorder 120A at the client device 100 and the recording 268 is delivered to the drama engine and/or the cloud gaming server system. In another embodiment, the recording is performed at the back-end cloud gaming server system. Narration may be automatically generated based on the information, such as by the narration generator 273. For example, the narration may include the information previously described (e.g., relating to personal and universal historical context associated with the event of dramatic significance), and presented with other canned information (e.g., to help merge the information into a flowing commentary of the game play). The narration and the recorded portion of the game play are merged to generate the media package (e.g., highlight reel) that is shareable, such as by sharing engine 285 over a social network. That is, the narration may be presented in the media package along with the game play of the player to include the event of dramatic significance. In addition, the reaction(s) 267 of the player playing the gaming application may also be captured, as previously described. The reaction(s) correspond to the event of dramatic significance. The reaction(s) may also be merged into the media package. The media packages are stored in database 148e.

In one embodiment, a plurality of events of dramatic significance is identified in the game play. The events may each be defined by a corresponding degree of dramatic significance. Some events may be very dramatic, while other events may be mildly dramatic. In addition, one or more portions of the game play corresponding to the plurality of events of dramatic significance are recorded for the player. Also, a highlight reel is automatically generated including the one or more portions of the game play corresponding to the plurality of events of dramatic significance. For example, the highlight reel generator 283 is configured to automatically generate a highlight reel of one or more events in a player's game play. In addition, narration may be merged into the highlight reel, as previously described. Further, reactions 267 of the player may be merged into the highlight reel, wherein the reactions corresponding to one or more of the identified events of dramatic significance. In the highlight reel, a slow-motion (slo-mo) replay may be generated of one or more portions of events, or one or more events. For example, the slo-mo generator 371 is configured for generating the slo-mo portions.

In one embodiment, the validation enforcement engine 277 is configured to validate an event of dramatic significance that is identified. For example, engine 277 may be configured for receiving confirmation from the player validating the event of dramatic significance. In one implementation, the confirmation may be in the form of a tag 266 delivered by the player through the client device 100. In another implementation, the confirmation may be through biometric signals of the player as detected through sensors in association with the client device 100. For example, when an event of dramatic significance is being experienced by the corresponding player, his or her biometric signals may indicate elevated excitement of the player. In that manner, the data collected in association with the event of dramatic significance may be stored as event training data in database 148*b*, and used as updated training data for defining a corresponding modeled event of dramatic significance.

Figure 3A:
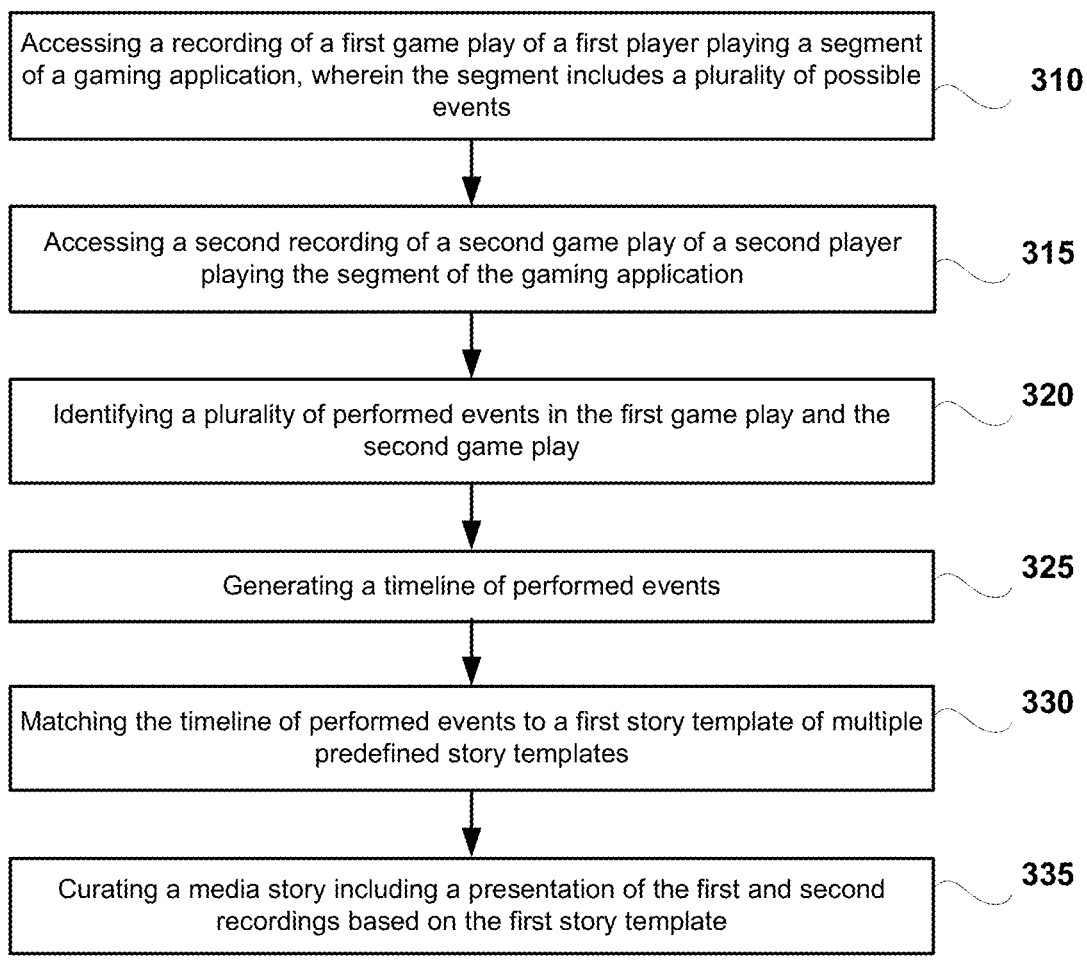
FIG. 3A illustrates a flow diagram illustrating steps in a method for packaging of two or more recordings of game plays of a gaming application in a media package that is edited to provide a story that is compelling to its viewers, in accordance with one embodiment of the present disclosure.

With the detailed description of the various modules of the cloud gaming server system 151 and client device 100 communicating over a network 150, a method for providing dramatization of video gaming is disclosed, including the packaging of two or more recordings of game plays of a gaming application in a media package that is edited to provide a story that is compelling to its viewers, wherein the gaming application can be executing on a local computing device or over a cloud gaming server system is now described in relation to flow diagram 300A of FIG. 3A, in accordance with one embodiment of the present disclosure. Flow diagram 300A illustrates the process and data flow of operations involved at the cloud gaming server side for purposes of generation of the media package that is edited to provide a story relating two or more recordings of game play of a gaming application, as implemented in part through a through a deep learning engine. In particular, the method of flow diagram 200A may be performed at least in part by the drama engine 160 and/or AI server 170 of FIG. 1A.

In particular, at 310 the method includes accessing a first recording of a first game play of a first player. The first player is playing a segment of a gaming application, wherein the gaming application is played in single-player mode. Further, the segment of the gaming application includes a plurality of possible events (e.g., one or more possible events). In one embodiment, the segment may be a defined challenge within the gaming application (e.g., as defined by the developer, or by players). For example, the events may be one of sub-events or ordinary events, as previously described. The events may include an event of dramatic significance.

At 315, the method includes accessing a second recording of a second game play of a second player. The second player is playing the segment of the gaming application, wherein the gaming application is played in single-player mode. The second game play may be conducted and/or executed asynchronous from the first game play. For example, the game plays of the segment for the first and second players may occur at different times.

At 320, the method includes identifying a plurality of performed events in the first game play and the second game play. The identification of events may be performed using the process as described in FIG. 2A. For example, the identification of events may be based solely on the recordings, or may be based on the recordings in combination with information and metadata (e.g., game state) collected during those game plays. An event in a recording may be identified by matching data relating to that event with previously defined models of that type of event as performed by the AI server 170.

In particular, the identification of performed events includes the receiving over the network from the first client device first contextual data corresponding to the first game play of the first player. In addition, through artificial intelligence implementation a first plurality of performed events in the first game play is identified by matching the first contextual data to a plurality of classifiers defining the plurality of possible events for the segment. In addition, second contextual data corresponding to the second game play of the second player may be received over a network from a second client device. Through artificial intelligence implementation a second plurality of performed events in the second game play is identified by matching the second contextual data to a plurality of classifiers defining the plurality of possible events for the segment.

At 325, the method includes generating a timeline of the performed events identified from the first game play and the second game play. That is, the timeline includes identified events from the first and second game plays in chronological order. Further, at 330 the method includes matching the timeline of performed events to a first story template of a plurality of predefined story templates. For example, the timeline of performed events may be compared to one or more timelines of events of different story templates. A match between the generated timeline of performed events and the timing of events in a first story template may be determined when there is substantial alignment of events between both timelines. That is, the timeline of the performed events identified from the first game play and the second game play follows the timeline of events as defined within a particular story template.

At 335, the method includes curating a media story including a presentation of at least portions of the first recording and the second recording based on the first story template. The curating may include organizing portions of the recordings along with other information into a media package. For example, the first recording and the second recording (e.g., the video portions) may be presented side-by-side in a presentation. In addition, the curating may include generating a narration of the timeline of events identified from the first game play and the second game play based on the first storyline that is matched. The narration may include information relating to the historical significance or facts to game plays of one or more players, as previously described. The narration may also tell a story that is defined by the matched first story template, wherein the narration includes information that is consistent with the story. Further, the narration may be merged with the presentation of at least portions of the first recording and the second recording in order to generate the media package.

Figure 3B:
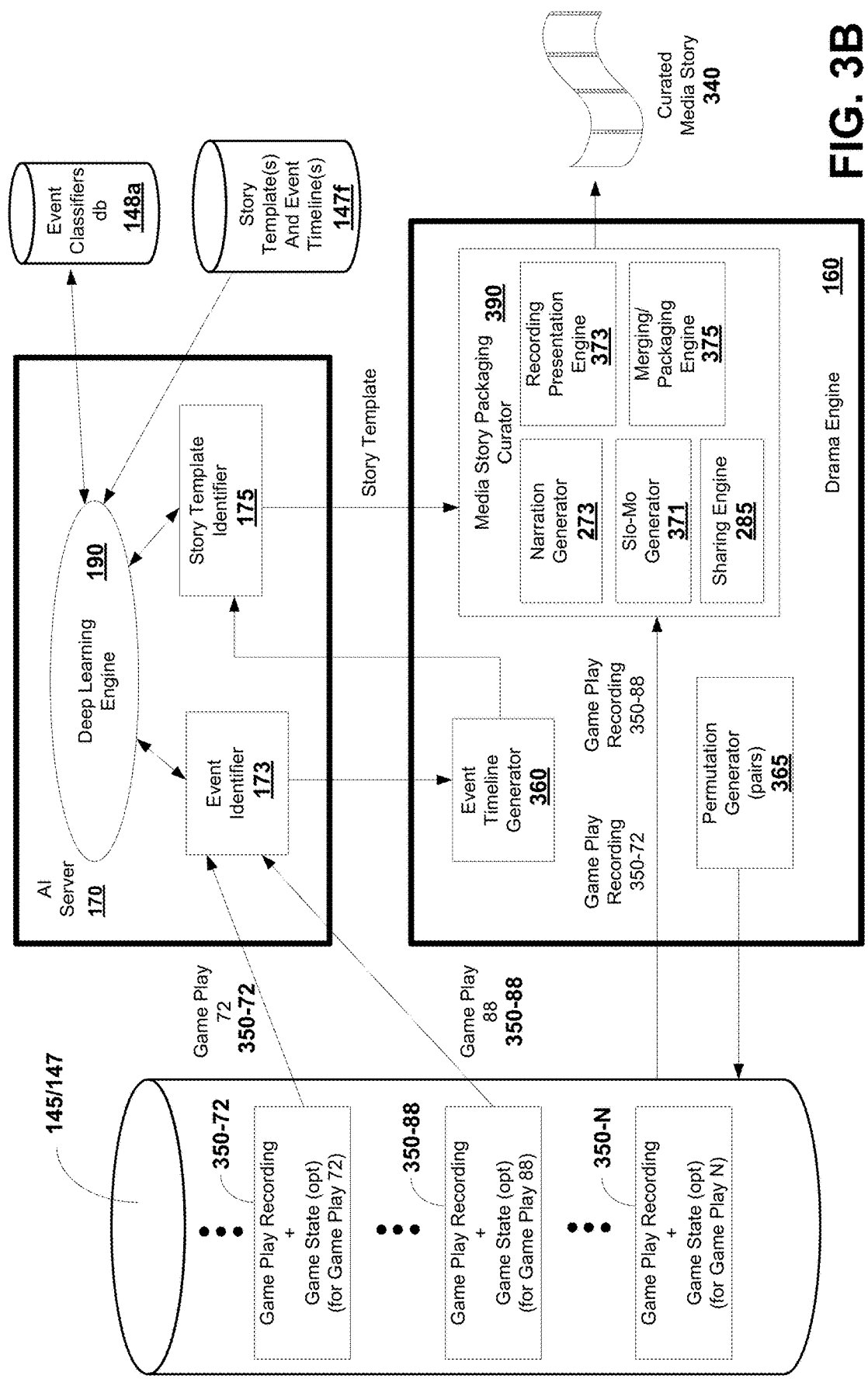
FIG. 3B illustrates a system including a drama engine configured for packaging of two or more recordings of game plays of a gaming application in a media package that is edited to provide a story that is compelling to its viewers, in accordance with one embodiment of the present disclosure.

FIG. 3B illustrates a system including a drama engine configured for packaging of two or more recordings of game plays of a gaming application in a media package that is edited to provide a story that is compelling to its viewers, in accordance with one embodiment of the present disclosure. The drama engine 160 is located at a back-end server, such as the cloud gaming server system 151. For example, the drama engine 160 may be configured to implement the method of flow diagram 300A, in one embodiment As shown, game play recordings are stored in database 147. In addition, for each game play recording, there may be game state and/or other metadata that is collected and/or captured, wherein the game state is stored in database 145. The game state and/or other metadata may optionally be used for identification of events in the recordings. For example, various game plays 1-N are recorded, and corresponding game state data is also captured. As is shown in FIG. 3B, a game play recording and game state (collectively referred to as game play data 350-72 for game play 72) are captured in relation to game play 72. Also, a game play recording and game state (collectively referred to as game play data 350-88 for game play 88) is captured in relation to game play 88. Further, a game play recording and game state (collectively referred to as game play data 350-N for game play N) is captured in relation to game play N.

Using this data provides for the creation of media packages that are associated with highly-impactful spectating experiences. For example, a challenge may be performed/run by different players, to generate one-thousand of those runs. The drama engine 160 is configured to determine which of those runs are the best runs worth broadcasting. The term "best" may not necessarily mean "the fastest time" or "the most kills." Instead, "best" may mean the most dramatic moments based on the player's or community's past performance in the game, or those game plays that provide drama following a particular story template. The drama engine 160 can ensure that all of the broadcasted media packages are nail-biting, edge-of-your-seat experiences: i.e., no more boring blow-outs, or games dragged out by penalties, etc.

In one embodiment, the pairing of game play data 350-72 for game play 72 and game play data 350-88 for game play 88 may be performed by permutation generator 365. For example, the permutation generator is configured to generate different permutations of pairings of game plays for comparison purposes to one or more story templates. In particular, different permutations of paired game plays are compared to the first story template, wherein each permutation has a corresponding timeline of performed events. In addition, permutations are selected for packaging as a corresponding media story when a corresponding timing of performed events from the corresponding timeline of performed events matches a timing of events defined in a corresponding story template, such as the first story template.

The matching of a pair of game play data is described in relation to the permutation including game plays 72 and 88. As shown, the game play data 350-72 for game play 72 and game play data 350-88 for game play 88 is delivered to the AI server 170. In particular, the data is delivered to the event identifier 173 for purposes of matching events (e.g., sub-events or ordinary events) occurring during the game plays of the first and second players to modeled events (e.g., as generated by the event classification modeler 171) stored in database 148a. Event matching may be performed in cooperation with the deep learning engine 190, as previously described.

In addition, once the events are identified in the game play of the first player and the second player, a timeline of the events is generated, for example by the event timeline generator 360 of the drama engine 160. In some embodiments, the timeline is generated by the AI server 170. The timeline is delivered back to the AI server for matching purposes. In particular, the timeline is delivered to the story template identifier 175, which is configured to match the timeline of performed events to a first story template of a plurality of predefined story templates, as previously described. For example, the matching may be performed using the deep learning engine 190 to compare timelines. For example, a match may be determined when a timing of performed events in the first game play and the second game play substantially align with a timing of events defined in a first story template. The story templates and event timelines may be stored in database 147f.

Once the story template is identified, a media package can be generated following the identified story template, for example the first story template. For example, the media story packaging curator 390 is configured to generate the media package. In one embodiment, the curator 390 performs substantially the same functionality as the media package generator 280. Recordings of the game plays 72 and 88 are delivered within game play data 350-72 for game play 72 and game play data 350-88 for game play 88. As previously described, the recoding presentation engine 373 is configured to present at least portion of the game play recordings for the first and second game plays. For example, the recordings (e.g., video) may be presented in a side-by-side presentation.

In addition, the narration generator 273 may be configured to automatically generate narration that is consistent and promotes the identified story template. For example, different story templates may include: an underdog scenario, a come-from-behind-win, a matching of blows-for-blows scenario, a photo finish, a Hail Mary pass to finish the game, a single-player record breaker, a team-statistics or universal multi-player record breaker, a scenario defined by the agony of defeat, a scenario defined by a rookie winning a game, a scenario defined by a struggling veteran and down on his or her luck wins the game, etc.

The merging packaging engine 375 is configured to merge the narration and the presentation into the media package. Other information and/or content may also be merged. For example, the slo-mo generator 371 may be configured for generating the slo-mo portions of the recorded game plays for the first and second players. For example, the slow-motion may be generated for one or more events in the timeline of performed events. The slow-motion of the one or more events may be merged with the presentation of at least portions of the first recording and the second recording. As such, a curated media story 340 may be generated by curator 390 that is shareable, such as by sharing engine 285 over a social network.

Figure 4A:
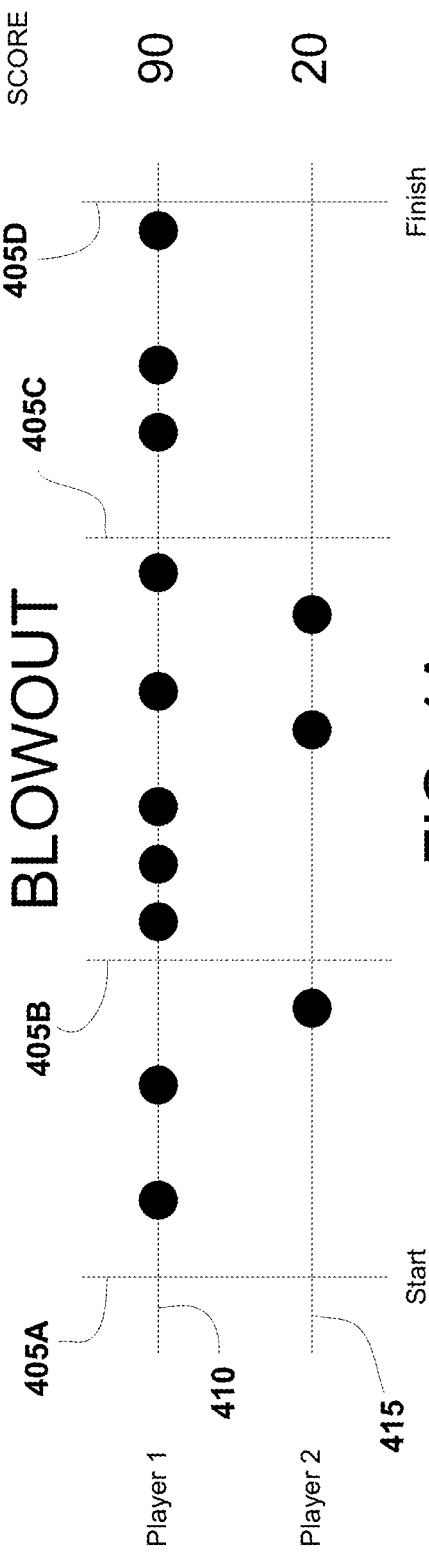

FIGS. 4A-4D illustrate various story templates used for generating a media package from two or more recordings of game plays of a gaming application, in embodiments of the present disclosure. In particular, FIG. 4A illustrates a blowout scenario 400A between game plays of player 1 and player 2 each asynchronously playing a gaming application. For example, a plurality of events for the game play of player 1 is shown in a sub-timeline 410. Also, a plurality of events for the game play of player 2 is shown in sub-timeline 415. The timelines may be referenced to a start point 405A, and end point 405D, and intermediate points 405B and 405C. In the blowout, player 1 is beating player 2 in a comparison of game plays by a significant margin (e.g., scoring 90 to 20). In that case, any media package showcasing the game plays of player 1 and player 2 playing the same challenge, for example, would not be worthy of spectating, and would not be packaged into a media package.

Figure 4B:
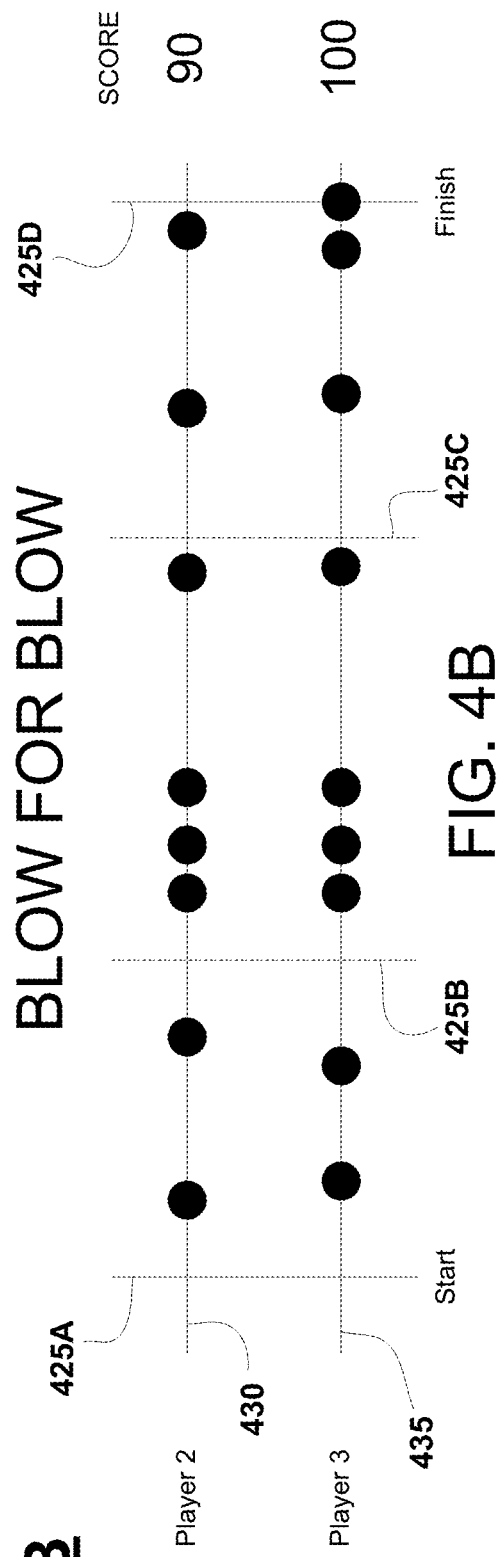

FIG. 4B illustrates a favorable blow-for-blow story template 400B, as illustrated by game plays of player 3 and player 4 each asynchronously playing a gaming application—e.g., in a challenge. For example, a plurality of events for the game play of player 3 is shown in a sub-timeline 430. Also, a plurality of events for the game play of player 4 is shown in sub-timeline 435. The timelines may be referenced to a start point 425A, and end point 425D, and intermediate points 425B and 425C. In the blow-for-blow story template, events that are identified in each of the sub-timelines 430 and 435 are closely aligned, such that whenever player 3 shows an event, player 4 also shows an event in close timing proximity. The head-to-head matchup of the two game plays may be scored with player 4 beating player 3 by a small margin—e.g., 100 to 90.

FIG. 4C illustrates a favorable photo-finish story template 400D, as illustrated by game plays of player 5 and player 6 each asynchronously playing a gaming application—e.g., in a challenge. For example, a plurality of events for the game play of player 5 is shown in a sub-timeline 450. Also, a plurality of events for the game play of player 6 is shown in sub-timeline 455. The timelines may be referenced to a start point 445A, and end point 445D, and intermediate points 445B and 445C. In the photo-finish story template, the events that are identified in each of the sub-timelines 450 and 455 may have equal scoring, especially towards the end of each of the game plays. That is, at the end point 445D, it may be unclear as to which player is going to score the highest in a head-to-head matchup between player 5 and player 6. As shown, player 5 beats player 6 by the slightest of margins (e.g., 100 to 99).

FIG. 4D illustrates a favorable last-second win story template 400D, as illustrated by game plays of player 7 and player 8 each asynchronously playing a gaming application—e.g., in a challenge. For example, a plurality of events for the game play of player 7 is shown in a sub-timeline 470. Also, a plurality of events for the game play of player 8 is shown in sub-timeline 475. The timelines may be referenced to a start point 465A, and end point 465D, and intermediate points 465B and 465C. In the last-second win story template, one player (e.g., player 7 may be leading throughout, in the head-to-head presentation. However, throughout the head-to-head presentation, player 8 is mounting a comeback. Near the end point 465D, player 8 scores repeatedly to catch up to player 7, in the head-to-head presentation. At the end point 465D, player 8 may just do enough to capture the win (e.g., 100 to 95), in the head-to-head presentation.

Figure 5:
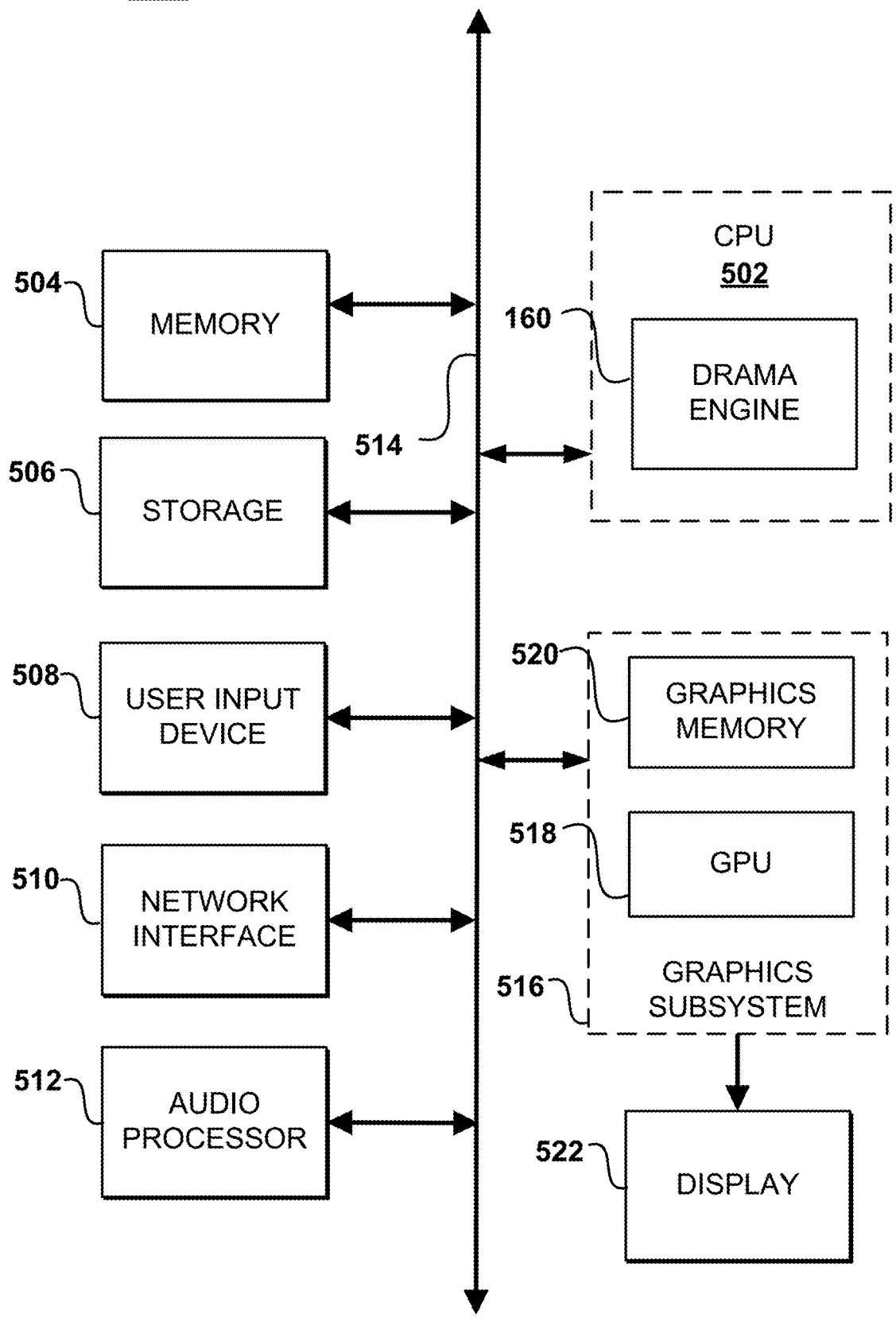
FIG. 5 illustrates components of an example device that can be used to perform aspects of the various embodiments of the present disclosure.

FIG. 5 illustrates components of an example device 500 that can be used to perform aspects of the various embodiments of the present disclosure. For example, FIG. 5 illustrates an exemplary hardware system suitable for implementing a device that is configured for surfacing context related facts and statistics during game play of a gaming application, and/or for packaging of two or more recordings of game plays of a gaming application in a media package that is edited to provide a story that is compelling to its viewers. This block diagram illustrates a device 500 that can incorporate or can be a personal computer, video game console, personal digital assistant, or other digital device, suitable for practicing an embodiment of the disclosure. Device 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as media and interactive entertainment applications, or applications configured for surfacing context related facts and statistics during game play of a gaming application, and/or for packaging of two or more recordings of game plays of a gaming application in a media package that is edited to provide a story that is compelling to its viewers, as previously described. Device 500 may be a localized to a player requesting assistance (e.g., game console), or remote from the player (e.g., back-end game assist processor).

CPU 502 includes a drama engine 160 that is configured for surfacing context related facts and statistics during game play of a gaming application, and/or for packaging of two or more recordings of game plays of a gaming application in a media package that is edited to provide a story that is compelling to its viewers.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522

A graphics subsystem 514 is further connected with data bus 522 and the components of the device 500. The graphics subsystem 514 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs.

The graphics subsystem 514 periodically outputs pixel data for an image from graphics memory 518 to be displayed on display device 510, or to be projected by projection system 540. Display device 510 can be any device capable of displaying visual information in response to a signal from the device 500, including CRT, LCD, plasma, and OLED displays. Device 500 can provide the display device 510 with an analog or digital signal, for example.

While specific embodiments have been provided to demonstrate the surfacing of context related facts and statistics during game play of a gaming application, and/or for packaging of two or more recordings of game plays of a gaming application in a media package that is edited to provide a story that is compelling to its viewers, these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the embodiments described herein may be executed on any type of client device. In some embodiments, the client device is a head mounted display (HMD), or projection system.

While specific embodiments have been provided to demonstrate the surfacing of context related facts and statistics during game play of a gaming application, and/or for packaging of two or more recordings of game plays of a gaming application in a media package that is edited to provide a story that is compelling to its viewers, these are described by way of example and not by way of limitation. Those skilled in the art having read the present disclosure will realize additional embodiments falling within the spirit and scope of the present disclosure.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for dramatizing video gaming, comprising:
receiving at a server over a network from a client device game state data during game play of a player playing a gaming application for identifying game context data corresponding to a current point in the game play, wherein the game state data is generated at the client device associated with the player executing the gaming application, wherein the game state data corresponds to the game play of the gaming application by the player;
during the game play of the player, identifying at the server an event of significance is occurring in association with the current point in the game play based on processing the game state data by the server to identify the game context data and historical data of a plurality of game plays of a plurality of players relating to the gaming application, wherein the identifying at the server the event of significance includes:
matching the game context data to one or more of a plurality of patterns of significance using an event classification model implementing artificial intelligence, wherein the matching uses some of the game state data captured during a period of time before the current point in the game play of the player to classify an event as matching a pattern of significance;
generating a total match score for the event that is classified matching the pattern of significance; and
identifying the event that is classified as the event of significance when the total match score satisfies a threshold;
generating at the server information detailing the event of significance based on the game context data and the historical data; and
sending the information over the network from the server to the client device for simultaneous presentation with the game play of the player such that the information is presented for an occurrence of the event of significance during the game play of the player.

2. The method of claim 1,
wherein the information includes a plurality of facts associated with the event of significance.

3. The method of claim 1, further comprising:
delivering the information over the network from the server to a device of a commentator providing live commentary of the game play.

4. The method of claim 1, further comprising:
weighting at the server the one or more of the plurality of patterns of significance before generating the total match score.

5. The method of claim 1, wherein the plurality of patterns of significance includes:
- beating a universal record across the plurality of players;
- beating a personal record;
- novelty of the event of significance;
- rarity of the event of significance;
- difficulty in accomplishing the event of significance;
- a positive trend of accomplishing the event of significance; and
- a negative trend of accomplishing the event of significance.

6. The method of claim 1, further comprising:
- receiving at the server confirmation from the player validating the event of significance; and
- including at the server the event of significance into artificial intelligence training data for a first event classifier, wherein a plurality of classifiers are generated using the artificial intelligence from at least the historical data, each of which classifies a corresponding event of significance.

7. The method of claim 1,
wherein the historical data of the plurality of game plays is personal to the player or universal across the plurality of players.

8. The method of claim 1, further comprising:
- generating at the server a narration of the game play, wherein the narration includes the information; and
- presenting the narration along with the game play of the player.

9. The method of claim 1, further comprising:
- recording a portion of the game play corresponding to the event of significance;
- generating at the server a narration of the portion of the game play based on the information;
- merging at the server the narration and the portion of the game play to generate a highlight reel that is shareable.

10. The method of claim 9, further comprising:
- capturing a reaction of the player during the portion of the game play corresponding to the event of significance; and
- merging at the server the reaction into the highlight reel.

11. The method of claim 1,
wherein the game context data includes the game state data.

12. The method of claim 1, further comprising
- identifying a plurality of events of significance in the game play;
- recording one or more portions of the game play corresponding to the plurality of events of significance; and
- generating a highlight reel including the one or more portions of the game play corresponding to the plurality of events of significance.

* * * * *